United States Patent Office 3,148,690
Patented Sept. 15, 1964

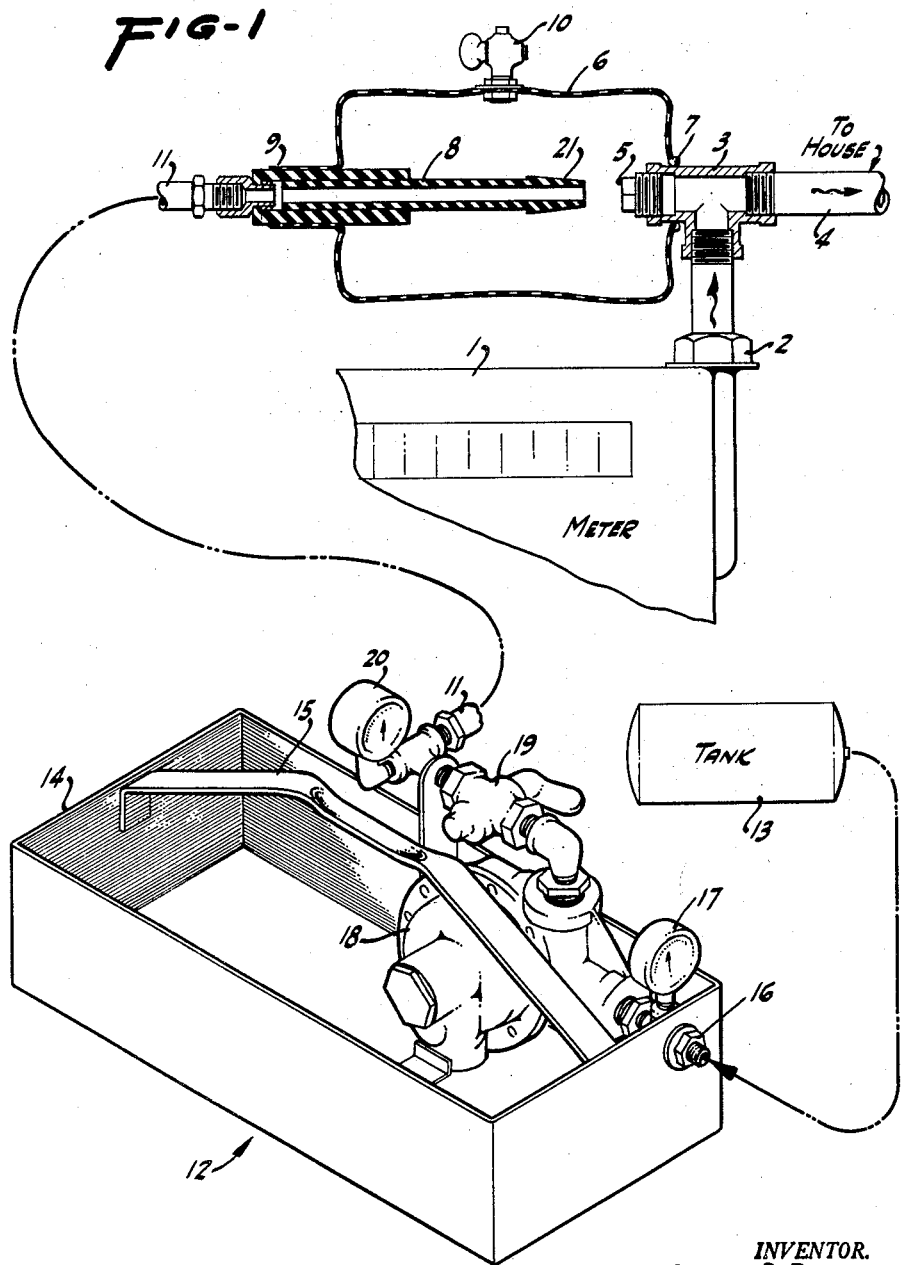

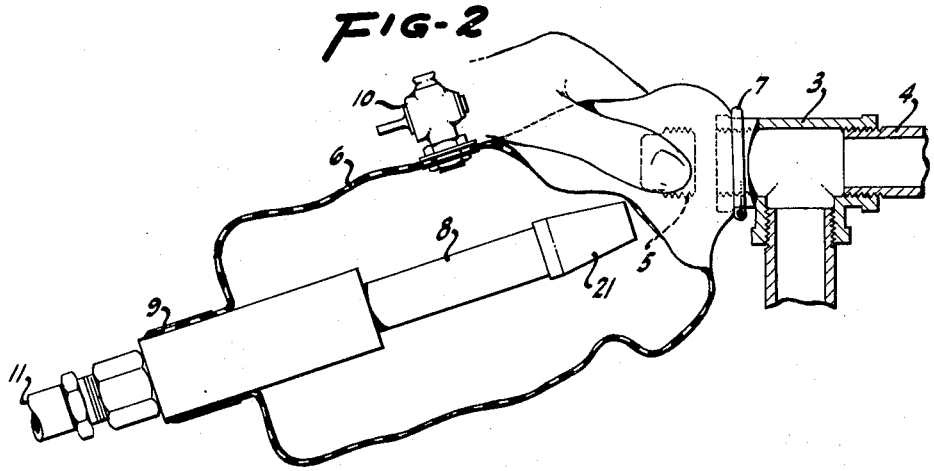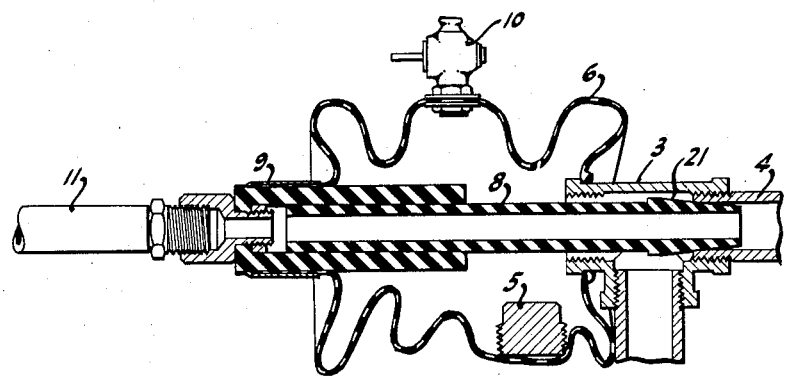

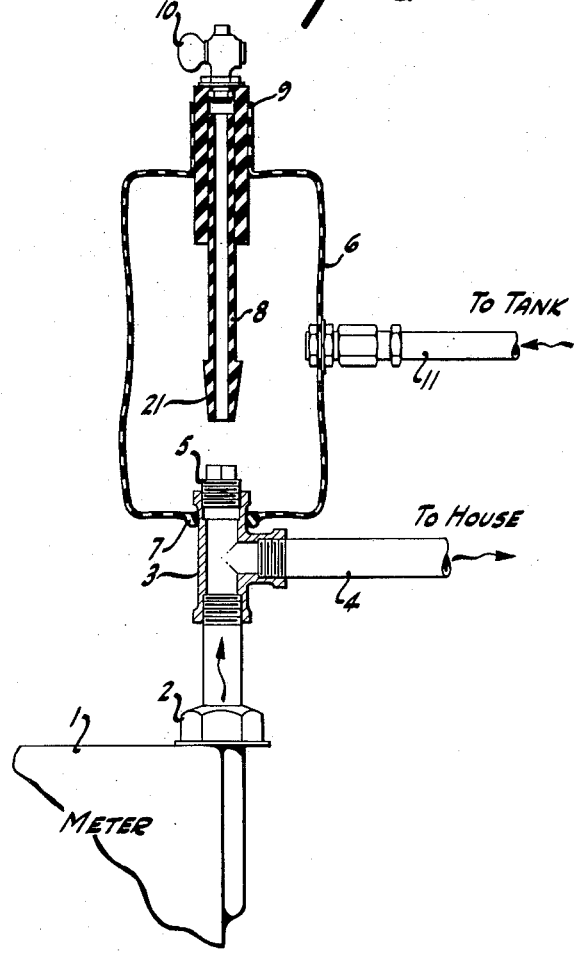

3,148,690
METHOD AND APPARATUS FOR
CHANGING GAS METERS
Albert D. Petersen, San Gabriel, Calif., assignor to
Charles Grunsky, San Francisco, Calif.
Filed Mar. 10, 1961, Ser. No. 94,873
8 Claims. (Cl. 137—15)

This invention relates to means for supplying gas to an outlet pipe while changing the gas meter through which the gas is normally supplied. By avoiding any interruption in gas supply during the necessary meter removal and replacement, the need to inspect all appliances and relight all pilot lights after normal service has been restored is eliminated. Thus, the average total time required for a service call to change a meter has been cut in half.

The present invention can be used with installations in which the gas meter is connected to the outlet pipe (leading into a house, for example) through a union and a T. Two arms of the T lie along a straight line and face in opposite directions; one of these arms is normally closed by a removable plug, and the other is connected either to the outlet pipe (herein called Case I) or to a pipe leading from the meter (herein called Case II). In Case I, the base of the T (disposed at an angle to the aforesaid two arms) is connected to the pipe leading from the meter, and in Case II the base is connected to the outlet pipe. The other side of the meter is conventionally connected to the gas supply mains through another union, usually a pressure regulator valve, and a cutoff valve.

According to the present invention, a device comprising a flexible bag is provided with a circular opening having a resilient rim that fits in gas-tight relation over the arm of the T normally closed by the removable plug. For devices to be used with installations wherein the base of the T leads to the meter (Case I), a tubular member, herein called a probe, extends into the flexible bag, the bag being sealed in gas-tight relation onto the probe, with one end of the tubular probe normally inside and the other end outside of the bag, so that the hollow probe provides a tube through which the bag may be filled with gas. The bag is also provided with a purge valve, or petcock, which can be opened to permit the escape of air from the bag. The outside end of the probe is connected through a flexible hose to an auxiliary supply of gas, e.g., regulating apparatus connected to a portable tank filled with gas under pressure. The portion of the probe within the flexible bag is of an appropriate size to extend through the T into the outlet pipe after the plug has been removed from its normal position in one arm of the T.

In the use of the device described, the arm of the T that is closed by the removable plug is inserted into the opening provided in the flexible bag, and the resilient rim around this opening makes a gas-tight seal with the T. The petcock is opened to allow the escape of air from the flexible bag, and gas is supplied through the hose and probe into the bag to fill the flexible bag with gas and purge the air from the bag. The petcock is then closed. Next, the removable plug is removed from the T by manipulation through the flexible walls of the bag, and the plug is allowed to fall into the bag, whereby one arm of the T opens into the bag and is accessible to the inside end of the probe. Now the probe can be inserted through the T into the outlet pipe, and this will provide a continuing supply of gas into the outlet pipe from the auxiliary gas supply. Engagement of the probe with the outlet pipe seals off the meter connections from the auxiliary supply; the main gas supply can now be cut off and the meter changed without affecting the continuing supply of gas to the outlet pipe from the auxiliary supply. After the meter has been replaced, the main gas supply is turned on, the petcock in the bag is opened to purge air from the new meter, and then the probe is removed while the flexible bag remains in place on the T. Now, the removable plug is replaced in the T and the auxiliary gas supply is cut off; then the flexible bag is removed and the job is complete.

For devices to be used with installations wherein the base of the T is connected to the outlet pipe (Case II), the construction is the same except that the flexible hose leading from the auxiliary gas supply is attached to a fitting which opens directly into the flexible bag outside of the hollow probe, and the purge valve, or petcock, is attached to the outer end of the probe. The use is also the same, except that the probe, when inserted through the T, extends into the pipe leading from the gas meter and thus seals off the meter from the gas, which now flows from the auxiliary supply through the flexible hose directly into the flexible bag, outside of the probe, and passes around the outside of the probe into the T and thus into the outlet pipe.

The invention may be understood better from the following illustrative description and the accompanying drawings.

FIG. 1 of the drawings is a somewhat schematic illustration of the auxiliary gas supply tank, the regulating apparatus shown in a projection view, and the flexible bag and probe shown in longitudinal section, in use with an installation in which the base of the T connects to the pipe leading from the meter.

FIG. 2 is a longitudinal section of the same flexible bag at the moment of removing the plug from the T.

FIG. 3 is a longitudinal section of the same flexible bag and probe, with the probe extending through the T into the outlet pipe.

FIG. 4 is a longitudinal section of the flexible bag and probe in use with an installation in which the base of the T connects to the outlet pipe.

Referring to FIGS. 1, 2, and 3 of the drawings, an ordinary household gas-supply installation may comprise a gas meter 1 connected through a union 2 and a short pipe to the base of a T 3. Outlet pipe 4, which carries gas into the house, is connected to one arm of the T 3. The other arm of T 3 is normally closed by a removable plug 5. The drawing shows only a fragment of the meter, which is entirely conventional, and which is supplied with gas in the usual manner by a connection, not shown, to the gas mains through a cutoff valve, a pressure regulator, and another union.

At times the meter 1 must be removed and replaced, e.g., because it is defective, or for purposes of testing and recalibrating the meter, or for other reasons. Heretofore, it has been necessary to shut off the gas supply to the meter, and thus to the house, while the meter was being changed. After the change was completed and gas service restored, all of the appliances in the house had to be inspected and all pilot lights relit, which typically took as much time as the meter-changing job itself. By maintaining an uninterrupted supply of gas to the house, so that pilot lights do not have to be relit, the average total time required to change a meter has been cut in half.

The present invention provides a device comprising a flexible, e.g., rubber, bag 6 provided at one end with a circular hole bounded by a resilient rim 7 of appropriate size to fit in gas-tight relation over the arm of T 3 that is closed by plug 5, as shown. Before the T is inserted into the opening of bag 6, plug 5 is loosened with a wrench, so that it can easily be removed after the bag is in place, in the manner herein described. A hard rubber tube, or probe, 8 extends into the bag 6 and is sealed in gas-tight relation to the probe at 9, so that the bag 6 can be filled with gas supplied through the hollow probe. Preferably, the probe extends through the end of bag 6 opposite to the hole bounded by rim 7. A purge valve or petcock 10 is provided for draining air from bag 6.

The outer end of probe 8 is connected through a flexible hose 11 (illustrated by the two end fragments joined by a broken line) to an auxiliary gas supply, preferably comprising the regulating apparatus illustrated generally at 12, which receives gas either from a connection to the gas mains, or, more commonly, from a portable tank 13 filled with gas under appropriate pressure. The regulating apparatus is housed in a small metal tray 14, having a handle 15 by which it can be carried from place to place, and of a suitable size to carry the bag 6, and other meter-changing equipment, as well as the gauges and valves permanently mounted on the tray. A gas inlet connection 16 is threaded to receive a hose for connecting it to tank 13, or any other appropriate gas supply. Gauge 17 registers the inlet gas pressure, and pressure regulator valve 18 maintains a constant, somewhat lower, output pressure to cutoff valve 19, by means of which the gas supply to probe 8 can be turned on and off, as desired. Pressure gauge 20 indicates the outlet pressure of the gas supplied to probe 8.

As has been stated, plug 5 is loosened with a wrench, and then the bag 6 is fitted onto the arm of T 3 that is normally closed by plug 5, in the manner illustrated in FIG. 1. Petcock 10 is opened to permit the escape of air from bag 6, and valve 19 is opened to permit the flow of gas from tank 13 through the regulating apparatus 12, hose 11, and probe 8 into the bag 6. As soon as all of the air has been purged from bag 6, petcock 10 is closed and the interior of bag 6 is completely filled with gas. Plug 5, having already been loosened, can now be removed from T 3 by manipulation with the fingers through the flexible rubber bag 6, as shown in FIG. 2. At this point, the cutoff valve controlling the normal supply of gas to meter 1 can be closed, and the supply of gas to the house will be maintained from the auxiliary supply through probe 8.

Next the probe 8 is inserted through the T into outlet pipe 4, as illustrated in FIG. 3. The end of probe 8 is preferably provided with a tapered portion 21, as shown, which forms a gas-tight fit with the end of outlet pipe 4, and thus isolates the meter connection from the auxiliary supply of gas through probe 8 into the outlet pipe. The probe and bag structure now defines two separate flow paths, which are fully isolated from each other. One flow path extends through the inside of hollow probe 8 into the outlet pipe 4—gas from the auxiliary supply flows through this path directly into the outlet pipe. The other flow path extends from bag 6 around the outside of probe 8 into T 3—this path permits the purging of air from the meter through petcock 10 as hereinafter explained.

The supply of gas to the meter from the mains is now cut off, if this has not already been done, and the meter is removed by loosening the unions through which it is connected to the gas mains and the T 3. The new meter is installed in the usual way, and gas supply to it from the mains is established by opening the conventional cutoff valve which precedes the meter.

The next step is to purge air from the new meter. This is done with probe 8 still in the position shown in FIG. 3, by opening the petcock 10, which allows any air within the new meter to escape along the flow path extending around the outside of probe 8 through T 3, bag 6, and petcock 10. As soon as all of the air has been purged, the petcock 10 is closed, and the probe 8 can be withdrawn from the T 3. Now, while flexible bag 6 is still in place, plug 5 can be grasped by the fingers through the walls of the flexible bag, and inserted back into the arm of T 3 that it normally closes. After tightening plug 5 as much as is convenient by manipulation through the flexible wall of bag 6, valve 19 is closed to shut off the auxiliary gas supply, and bag 6 is removed from T 3. If desired, the auxiliary gas supply can be shut off before replacing plug 5, e.g., immediately after removing probe 8 from the T. All that now remains to be done is to tighten plug 5 with a wrench, and the meter-changing job has been completed. Because there was no interruption of the gas supply through outlet pipe 4 to the house, it will not be necessary to relight the pilot lights in the gas appliances within the home.

For use with installations in which the base of the T is connected to the outlet pipe, the meter-changing device is modified as illustrated in FIG. 4. The hose 11 is connected to supply gas from the auxiliary supply directly into the flexible bag 6 outside of probe 8, and the petcock 10 is attached to the outer end of the hollow probe. After loosening the plug 5, the hollow bag is fitted, as before, over the end of T 3 that is closed by the removable plug. The auxiliary gas supply is turned on and petcock 10 is opened to purge the air from bag 6—in this case, the gas flows directly into the bag, and the air flows out through the hollow probe. Next, petcock 10 is closed, plug 5 is grasped by the fingers through the flexible walls of bag 6 and removed from T 3, and probe 8 is inserted through the T into the pipe leading from meter 1. Tapered portion 21 of the probe fits in gas-tight relation into the end of this pipe, thus sealing off the meter connections from the T, and provides two separate flow paths: one through the hollow probe 8, and one around the outside of the probe into T 3. Gas from the auxiliary supply passes through hose 11 directly into bag 6, and flows through the path extending around the outside of probe 8 into T 3 and thus into outlet pipe 4. The gas supply from the mains to the meter can now be cut off, and meter 1 can be removed and replaced without interrupting the supply of gas to the house.

After the new meter has been connected and the gas supply from the mains to the meter is turned back on, petcock 10 is opened to purge the air from the new meter through the hollow probe 8. Then the petcock is closed and the probe is withdrawn from the T. While bag 6 remains in place on T 3, plug 5 is replaced in the T and the auxiliary gas supply is cut off. Then bag 6 is removed, plug 5 is tightened, and the job is finished.

Various changes and modifications of the specific examples illustrated and described can be made within the scope of the inventive principles disclosed.

What is claimed is:

1. A device for supplying gas to an outlet pipe while changing a gas meter connected to the outlet pipe through a T, one arm of the T being normally closed by a removable plug, said device comprising a flexible bag provided with a circular opening having a resilient rim adapted to fit in gas-tight relation over the arm of the T closed by the plug, and a tubular hollow probe extending in gas-tight relation into said bag, said probe having an inner end normally within said bag and an outer end outside of the bag, the inner end of said probe being adapted to extend through said T when said rim is fitted onto the T and the plug is removed from the T and seal the outlet pipe from the gas meter connection.

2. A device for supplying gas to an outlet pipe while changing a gas meter connected to the outlet pipe through a T, the T having two arms facing in opposite directions along a straight line and a base disposed at an angle to said arms, one of said arms being normally closed by a removable plug, said device comprising a flexible bag provided with a circular opening having a resilient rim adapted to fit in substantially gas-tight relation over the arm of the T that is normally closed by the plug, a hollow probe extending in gas tight relation into said bag, said probe having an inner end normally within said bag and an outer end outside of said bag, the inner end of said probe being adapted to extend through said T when said rim is fitted onto the T and the plug is removed from the T, said probe then extending through the arm that is normally closed by said plug into the opposite arm of the T and defining with the T two separate flow paths, one path extending through the hollow probe into said opposite arm of the T and one path extending through said bag and around the outside of said probe into the base of said T, one of said paths leading to the outlet pipe and the other path connecting with the meter, means for supplying gas to the path that leads to the outlet pipe, and valve means for purging air from the path that connects with the meter.

3. A device for supplying gas to an outlet pipe while changing a gas meter connected to the outlet pipe through a T, the gas meter being connected to the base of the T through a union, the outlet pipe being connected to one arm of the T, and the other arm of the T being normally closed by a removable plug, said device comprising a flexible rubber bag provided at one of its ends with a circular opening, said bag having a resilient rim extending around said opening and adapted to fit in gas-tight relation over the arm of the T closed by the removable plug, a tubular, hollow, rubber probe extending into said bag in gas-tight relation therewith through the end thereof opposite said circular opening, the inner end of said probe being adapted to extend through the T into the outlet pipe when said rim is fitted over the T and the plug is removed from the T, said inner end of the probe being provided with a tapered portion adapted to form a gas-tight seal with the outlet pipe, so that gas may be supplied through the probe directly into the outlet pipe, a petcock attached to said bag for purging air therefrom, a flexible hose connected to the outer end of said probe for supplying gas thereto, regulating apparatus connected to said hose, and means for supplying gas to said regulating apparatus.

4. A device as in claim 3, said regulating apparatus comprising a tray, a gas inlet connection mounted on said tray, a pressure regulator valve mounted on said tray and connected to said inlet connection, and a cutoff valve mounted on said tray and connected to said pressure regulator valve.

5. A device for supplying gas to an outlet pipe while changing a gas meter connected to the outlet pipe through a T, the outlet pipe being connected to the base of the T, one arm of the T being connected to a pipe leading from the gas meter and the opposite arm of the T being normally closed by a removable plug, said device comprising a flexible bag provided with a circular opening having a resilient rim adapted to fit in gas-tight relation over the arm of the T closed by the plug, a tubular hollow probe extending into said bag, said bag being sealed in gas-tight relation to said probe, so that the hollow probe provides an outlet for air to be purged from the bag, a purge valve attached to the outer end of said probe, said probe being adapted to extend through said T when the plug is removed therefrom and into the pipe leading to the gas meter and defining with the T a flow path communicating with the outlet pipe and the bag, and auxiliary gas-supply means for supplying gas into said bag outside of said probe, so that the gas can pass alongside the probe into the outlet pipe.

6. A method for supplying gas to an outlet pipe while changing a gas meter connected to the outlet pipe through a T, one arm of the T being normally closed by a removable plug, the opposite arm of the T being connected to the outlet pipe, the base of the T being connected to the gas meter, which comprises fitting a flexible bag in gas-tight relation over the arm of the T closed by the plug, removing the plug, inserting a hollow probe through the T into the outlet pipe to establish a flow path through the bag and T in communication with the outlet pipe separate and independent from the flow path containing the meter, supplying gas from an auxiliary supply through the hollow probe directly into the outlet pipe, removing and replacing the gas meter while the bag and probe remain in place, then removing the probe while the bag remains in place, replacing the plug in the T, and finally removing the flexible bag.

7. A method for supplying gas to an outlet pipe while changing a gas meter connected to the outlet pipe through a T, one arm of the T being normally closed by a removable plug, the opposite arm of the T being connected to a pipe leading from the gas meter, the base of the T being connected to the outlet pipe, which comprises fitting a flexible bag in gas-tight relation over the arm of the T closed by the plug, removing the plug, inserting a probe through the T into the pipe leading from the gas meter to establish a flow path through the bag and T in communication with the pipe leading from the meter separate and independent from the flow path containing the outlet pipe, supplying gas from an auxiliary supply directly into the bag and thence alongside the probe into the T and the outlet pipe, removing and replacing the gas meter while the bag and probe remain in place, then removing the probe while the bag remains in place, replacing the plug in the T, and finally removing the flexible bag.

8. The method of changing gas meters that are connected to an outlet pipe through a T, one arm of the T being closed by a removable plug, which comprises fitting a flexible bag in gas tight relation onto the arm of the T that is closed by the plug, filling said bag with gas and purging air therefrom, removing the plug from the T and allowing it to remain within the bag, inserting a probe which extends into said bag through the arm of the T from which the plug has been removed and into the pipe connected to the opposite arm of the T therefrom, thereby defining two separate and independent flow paths, one leading to the outlet pipe and the other connecting with the meter, supplying gas through said one flow path directly into the outlet pipe while the meter is being changed and a replacement meter is reconnected to said T, purging air from the replacement meter through said other flow path, removing said probe from the T while the gas filled bag remains in place, replacing the removable plug in the T, and finally removing said bag.

References Cited in the file of this patent
UNITED STATES PATENTS

| | | |
|---|---|---|
| 1,938,984 | Smith | Dec. 12, 1933 |
| 2,002,383 | Witt | May 21, 1935 |
| 2,510,513 | Mueller et al. | June 6, 1950 |
| 2,711,753 | Hoke | June 28, 1955 |